(12) United States Patent
Ramamoorthy et al.

(10) Patent No.: US 12,028,828 B2
(45) Date of Patent: Jul. 2, 2024

(54) METHOD AND APPARATUS FOR LOCATION MANAGEMENT IN A WIRELESS NETWORK

(71) Applicant: Samsung Electronics Co., Ltd., Suwon-si (KR)

(72) Inventors: Arunprasath Ramamoorthy, Bangalore (IN); Basavaraj Jayawant Pattan, Bangalore (IN); Kiran Gurudev Kapale, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/043,387

(22) PCT Filed: Apr. 21, 2022

(86) PCT No.: PCT/KR2022/005718
§ 371 (c)(1),
(2) Date: Feb. 28, 2023

(87) PCT Pub. No.: WO2022/231210
PCT Pub. Date: Nov. 3, 2022

(65) Prior Publication Data
US 2023/0300782 A1    Sep. 21, 2023

(30) Foreign Application Priority Data

Apr. 29, 2021 (IN) .............................. 202141109737
Mar. 21, 2022 (IN) .............................. 202141019737

(51) Int. Cl.
*H04W 64/00* (2009.01)
*H04L 65/1016* (2022.01)
(Continued)

(52) U.S. Cl.
CPC ....... *H04W 64/003* (2013.01); *H04L 65/1016* (2013.01); *H04L 65/1033* (2013.01); *H04L 65/611* (2022.05)

(58) Field of Classification Search
CPC ................................. H04W 4/90; H04L 65/40
See application file for complete search history.

(56) References Cited

U.S. PATENT DOCUMENTS

| 10,716,152 B2 | 7/2020 | Russell et al. |
| 2017/0142756 A1 | 5/2017 | Lee |

(Continued)

FOREIGN PATENT DOCUMENTS

| KR | 10-2018-0104060 A | 9/2018 |
| WO | 2016111528 A1 | 7/2016 |

OTHER PUBLICATIONS

International Search Report and Written Opinion of the International Searching Authority dated Aug. 3, 2022, in connection with International Application No. PCT/KR2022/005718, 21 pages.

(Continued)

*Primary Examiner* — Muthuswamy G Manoharan

(57) ABSTRACT

The disclosure relates to a 5G or 6G communication system for supporting a higher data transmission rate.
Embodiments herein disclose methods for location management in a wireless network by a MC client. The method includes receiving, by a MC client, at least one of a location reporting configuration request and a location information request from a location management server (LMS). Further, the method includes sending, by the MC client MC client, at least one of a MC gateway location reporting configuration request to a MC gateway UE based on the location reporting configuration request for an event triggered location reporting and a MC gateway location information request for an on-demand location to request a 3GPP access network related location information based on the location informa- (Continued)

tion request. Further, the method includes receiving a MC gateway location information report comprising location information requested by the MC client.

8 Claims, 12 Drawing Sheets

(51) Int. Cl.
*H04L 65/1033* (2022.01)
*H04L 65/611* (2022.01)

(56) References Cited

U.S. PATENT DOCUMENTS

2019/0098456 A1* 3/2019 Ge .................... H04W 4/90
2022/0329996 A1* 10/2022 Zhao .................. H04W 4/20

OTHER PUBLICATIONS

3GPP TR 23.700-79 V18.0.0 (Sep. 2021), Technical Report, 3rd Generation Partnership Project; Technical Specification Group Services and System Aspects; Study of Gateway User Equipment (UE) function for Mission Critical (MC) communications; (Release 18), Sep. 2021, 41 pages.

3GPP TS 23.280 V18.4.0 (Dec. 2022), Technical Specification, 3rd Generation Partnership Project; Technical Specification Group Services and System Aspects; Common functional architecture to support mission critical services; Stage 2 (Release 18), Dec. 2022, 328 pages.

Bsbos, et al., "Pseudo-CR on Functional architecture—Location information," S6-210092 (revision of S6-21xxxx), 3GPP TSG-SA WG6 Meeting #41-e, e-meeting, Jan. 18-26, 2021, 2 pages.

Bdbos, et al., "Configuration of MC service UE label," S6-211048 (revision of S6-210803), 3GPP TSG-SA WG6 Meeting #42-bis-e, e-meeting, Apr. 12-20, 2021, 10 pages.

Nokia, et al., "Clarify a figure on sharing IMS subscriptions," S6-210410 (revision of S6-21xxx), 3GPP TSG-SA WG6 Meeting #42-e, e-meeting, Mar. 1-9, 2021, 3 pages.

Nokia, et al., "MC gateway UE configuration," S6-210414 (revision of S6-21xxxx), 3GPP TSG-SA WG6 Meeting #42-e, e-meeting, Mar. 1-9, 2021, 5 pages.

Examination report dated Dec. 19, 2022, in connection with Indian Application No. 202141019737, 6 pages.

Supplementary European Search Report dated Aug. 25, 2023, in connection with European Application No. 22796043.2, 13 pages.

Nokia, et al., "Functional architecture refinements," S6-202138 (revision of S6-20xxxx), 3GPP TSG-SA WG6, Meeting #40-e, e-meeting, Nov. 16-24, 2020, 5 pages.

Samsung, et al., "3GPP Access Network related location Management by MC Clients," S6-211220, 3GPP TSG-SA WG6 Meeting #43, e-meeting, May 24-Jun. 2, 2021, 7 pages.

* cited by examiner

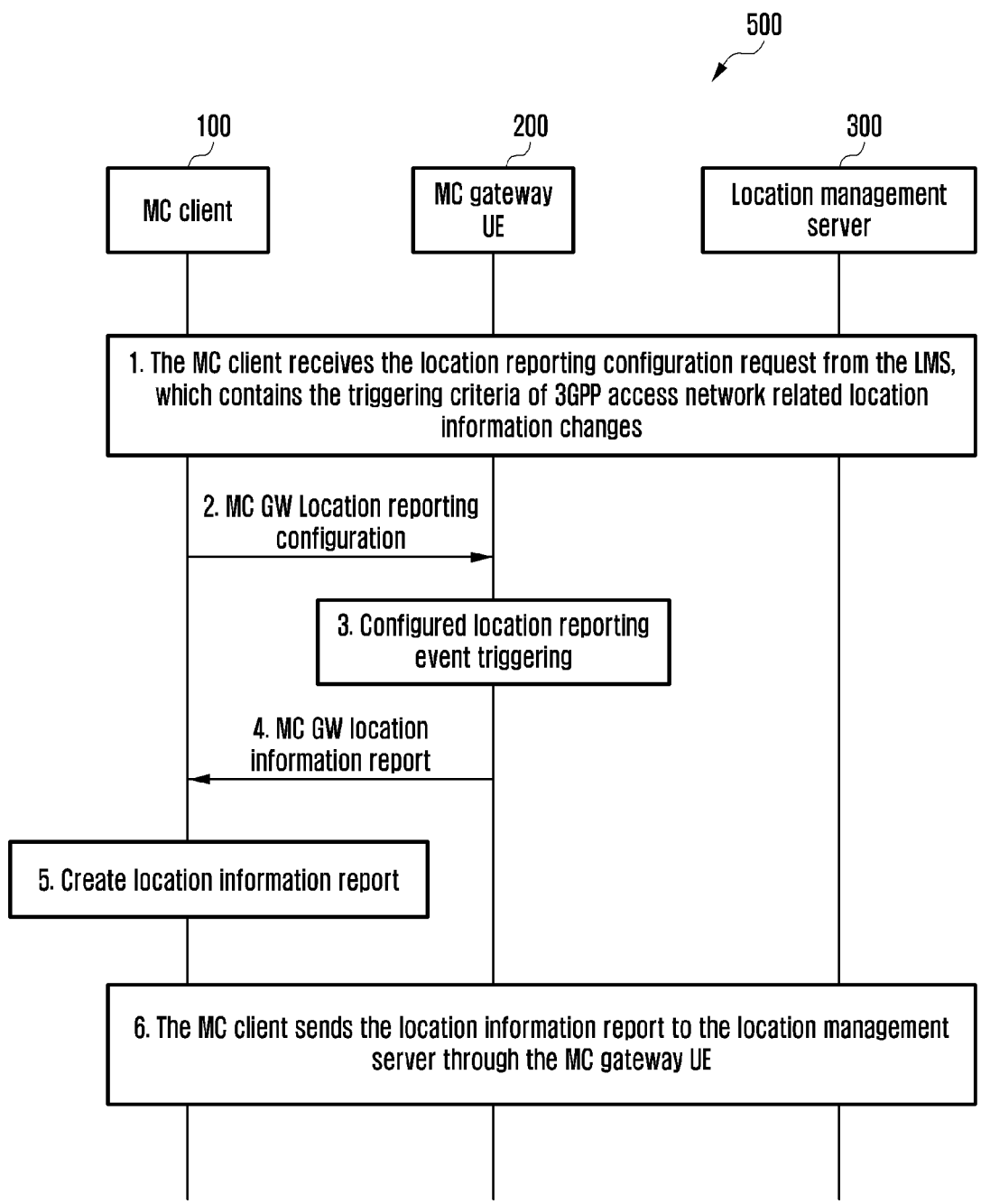

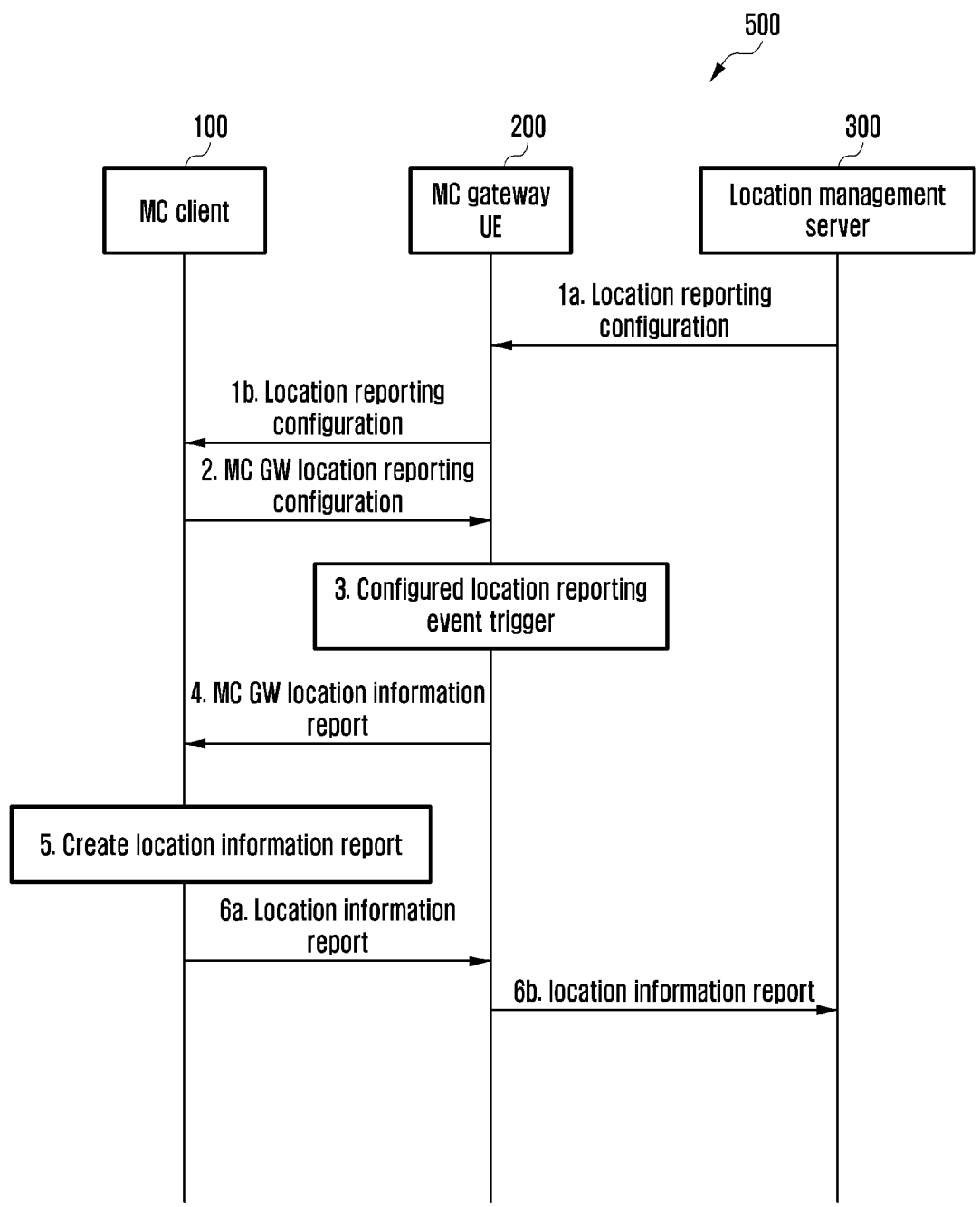

METHOD AND APPARATUS FOR LOCATION MANAGEMENT IN A WIRELESS NETWORK

CROSS-REFERENCE TO RELATED APPLICATIONS

This application is a 371 National Stage of International Application No. PCT/KR2022/005718, filed Apr. 21, 2022, which claims priority to Indian Patent Application No. 202141019737, filed Apr. 29, 2021, and Indian Patent Application No. 202141019737, filed Mar. 21, 2022, the disclosures of which are herein incorporated by reference in their entirety.

BACKGROUND

1. Field

Embodiments disclosed herein relate to mission critical (MC) services in wireless communication networks and more particularly to MC clients residing on non 3rd Generation Partnership Project (3GPP) devices accessing a MC system through a MC Gateway UE (as specified in 3GPP TR 23.700-79).

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

For MC clients getting MC service access via a MC gateway UE, the MC gateway UE forwards (unmodified) signalling and media from the individual MC clients to a MC server and vice versa. Since the MC clients are residing on non 3GPP devices, they would not be able to report a location information related to a 3GPP access network and also handle the location report triggering criteria which are related to the 3GPP access network.

A location reporting configuration request [Clause 10.9.2 of 3GPP TS 23.280], which is sent from the location management server to a location management client, carries triggering criteria which identifies when the location management client will send the location report. The triggering criteria could be based on the 3GPP access network related parameters. For example, send the location report whenever cell identifier (ID) changes or Tracking Area changes or Multimedia Broadcast Multicast Services standalone (MBMS SA) changes, MBMS FN Area changes etc., If the MC client is residing in the non 3GPP devices, they may not be able to track this information since they do not have access to the 3GPP access network. Also, the location reporting configuration may request the MC client to publish the location information related to 3GPP access network.

It is desired to address the above-mentioned disadvantages or other short comings or at least provide a useful alternative.

The principal object of the embodiments herein is to disclose systems and methods for enabling MC clients residing on non-3GPP devices to handle location triggering criteria and location information related to the 3GPP access network, while reporting the location information to the MC system through a MC gateway UE.

Another object of the embodiments herein is to disclose that a MC gateway UE handles location information related to a 3GPP access network and handles of the location reporting criteria containing the triggers related to the 3GPP access network Another object of the embodiments herein is to disclose that the MC client resides on the non-3GPP devices to handle the location reporting configuration containing the trigger criteria related to the 3GPP access network and provides the location information related to the 3GPP access network when requested. Without these procedures a location management server would not be able to configure the location triggers and fetch the location information related to the 3GPP access network. Since the MC clients residing on the non 3GPP devices do not have interface with the 3GPP network they will never be able to handle the location information requests and location information triggers related to the 3GPP access network. Also, the MC network can be transparent and do not have make any special considerations if the deployment contains the MC clients residing on non 3GPP devices.

Accordingly, the embodiments herein provide a method for location management in a wireless network (e.g., fifth generation (5G) network, Open Radio Access Network (O-RAN), sixth generation (6G) network or the like). The method includes receiving, by a mission critical (MC) client, at least one of a location reporting configuration request and a location information request from a location management server (LMS). Further, the method includes sending, by the MC client, at least one of a MC gateway (GW) location reporting configuration request to a MC gateway UE based on the location reporting configuration request for an event triggered location reporting and a MC gateway location information request for an on-demand location to request a 3rd Generation Partnership Project (3GPP) access network related location information based on the location information request. Further, the method includes receiving, by the MC client, a MC GW location information report comprising location information requested by the MC client.

In an embodiment, further, the method includes configuring, by the MC client, a location information report comprising locally available location information and the location information received from the MC gateway. Further, the method includes sending, by the MC client, the location information report to the location management server through the MC gateway UE.

In an embodiment, sending, by the MC client, the MC gateway location information request for the on-demand location to request the 3GPP access network related location information based on the location information request includes notifying, by the MC client, a MC service user to obtain a permission to share location information, and sending, by the MC client, the MC gateway location information request for the on-demand location to request the 3GPP access network related location information based on the location information request.

In an embodiment, the location reporting configuration request comprises a triggering criteria corresponding to the 3GPP access network related location information change.

In an embodiment, the location information request comprises the location information related to a 3GPP access network related location information.

In an embodiment, the MC GW location reporting configuration request includes at least one of a GW MC service identifier (ID), requested location information, triggering criteria, and minimum time between location information reports, and where the MC GW location information report comprises at least one of a GW MC service ID, a triggering event, and location information.

In an embodiment, the MC gateway UE stores a 3GPP access network related location information trigger and starts monitoring for the 3GPP access network related location information trigger, and where the MC client resides on a non-3GPP device.

Accordingly, the embodiments herein provide a method for location management in a wireless network. The method includes receiving, by a MC gateway UE, at least one of a MC GW location reporting configuration request and a MC GW location information request from a MC client. The MC client receives a location reporting configuration request from a location management server. The location reporting configuration request comprises the location trigger events related to the 3GPP access network related location information. The MC client receives a location information request containing the 3GPP access network related information from the location management server. The method includes sending, by the MC gateway UE, a MC GW location information report comprising location information requested by the MC client.

In an embodiment, the MC gateway UE sends the MC GW location information report comprising the location information requested by the MC client when a configured location reporting event triggers and when the MC client requests for immediate location report.

Accordingly, the embodiments herein provide a method for location management in a wireless network. The method includes receiving, by a MC gateway UE, a MC GW location reporting configuration request from a MC client. The MC GW location reporting configuration request notifies to stop a MC GW location information report from the MC Gateway UE. Further, the method includes stopping, by the MC gateway UE, to prepare a MC GW location information report based on the MC GW location reporting configuration request.

Accordingly, the embodiments herein provide A MC client in a wireless network. The MC client includes a location management controller coupled to a memory and a processor. The location management controller is configured to receive at least one of a location reporting configuration request and a location information request from an LMS. Further, the location management controller is configured to send a MC GW location reporting configuration request to a MC gateway UE based on the location reporting configuration request for an event triggered location reporting and a MC gateway location information request for an on-demand location to request a 3GPP access network related location information based on the location information request. Further, the location management controller is configured to receive a MC GW location information report comprising location information requested by the MC client.

Accordingly, the embodiments herein provide a MC gateway UE in a wireless network. The MC gateway UE includes a location management controller coupled to a memory and a processor. The location management controller is configured to receive at least one of a MC GW location reporting configuration request and MC GW location information request from a MC client. The MC client receives a location reporting configuration request from a location management server. The location reporting configuration request includes location trigger events related to the 3GPP access network related location information. The MC client receives a location information request containing the 3GPP access network related information from the location management server. The location management controller is configured to send a MC GW location information report comprising location information requested by the MC client.

Accordingly, the embodiments herein provide a MC gateway UE in a wireless network. The MC gateway UE includes a location management controller coupled to a memory and a processor. The location management controller is configured to receive a MC GW location reporting configuration request from a MC client. The MC GW location reporting configuration request notifies to stop a MC GW location information report from the MC Gateway UE. Further, the location management controller is configured to stop to prepare a MC GW location information report based on the MC GW location reporting configuration request.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the scope thereof, and the embodiments herein include all such modifications.

According to the present disclosure, it is possible to smoothly proceed with the location report of the MC clients residing on the non 3GPP devices.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 1A depicts a sequence diagram in which a MC Gateway UE handles an event-triggered location reporting procedure, according to embodiments as disclosed herein;

FIG. 1B depicts another sequence diagram in which the MC Gateway UE handles the event-triggered location reporting procedure, according to embodiments as disclosed herein;

DETAILED DESCRIPTION

Figure 2A:
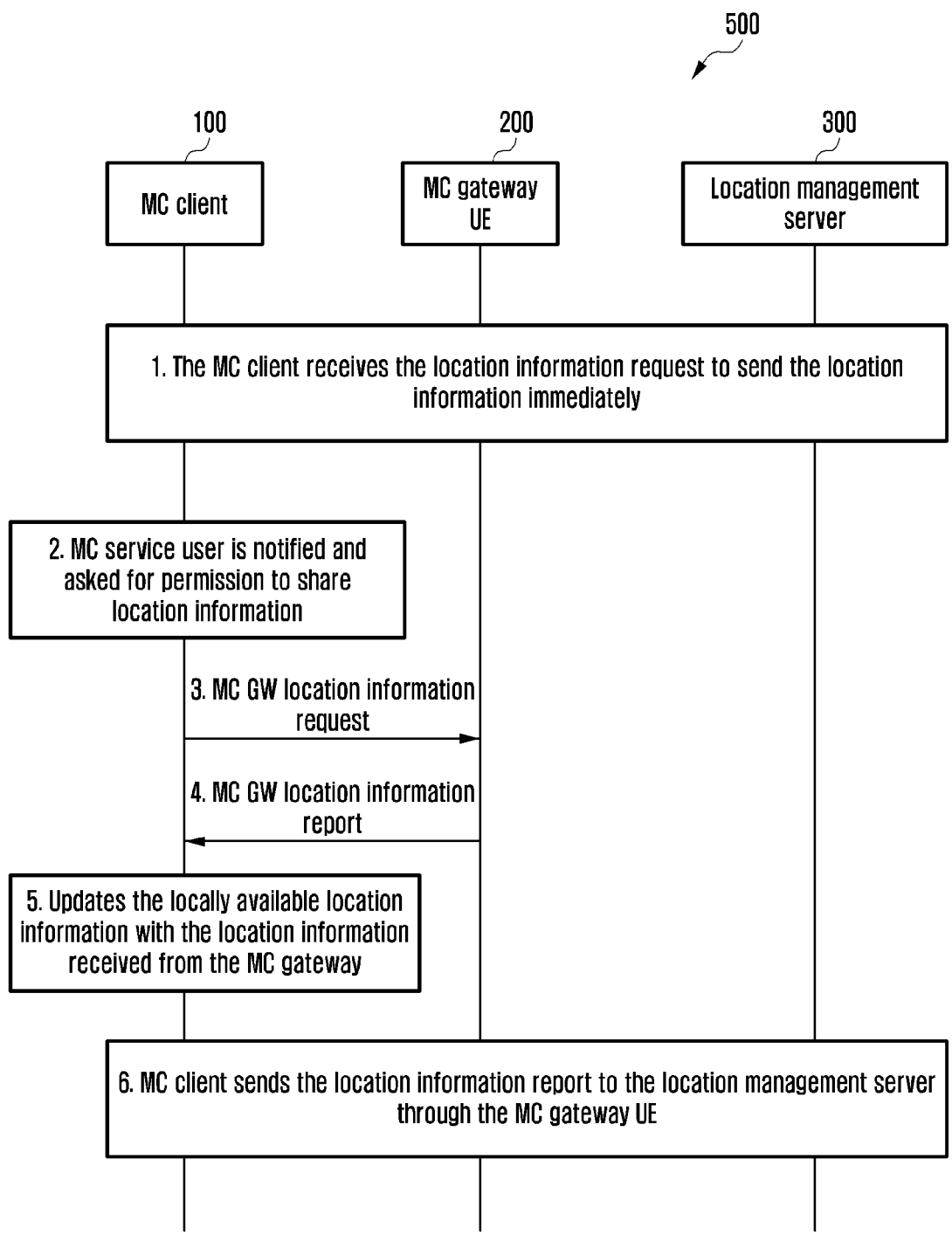
FIG. 2A and FIG. 2B depict sequence diagram in which the MC gateway UE handles an on-demand location reporting procedure, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods for location management in a wireless network (e.g., fifth generation network, Open Radio Access Network (O-RAN) or the like). The method includes receiving, by a MC client, at least one of a location reporting configuration request and a location information request from a LMS. Further, the method includes sending, by the MC client, at least one of a MC GW location reporting configuration request to a MC gateway UE based on the location reporting configuration request for an event triggered location reporting and a MC gateway location information request for an on-demand location to request a 3GPP access network related location information based on the location information request. Further, the method includes receiving, by the MC client, a MC GW location information report comprising location information requested by the MC client.

The proposed method can be used for enabling MC clients residing on the non 3GPP devices to handle location triggering criteria and location information related to the 3GPP access network, while reporting the location information to the MC system through the MC gateway UE. This results in improving the user experience and avoiding the service interruption.

Referring now to the drawings, and more particularly to FIGS. 1A through 10, where similar reference characters denote corresponding features consistently throughout the figures, there are shown at least one embodiment.

The 3GPP TR 23.700-79 studies the key issues and solutions to enable the MC clients (100) residing on the non 3GPP devices to access the MC system through a MC gateway UE (200). The MC gateway UE (200) resides on the device which has access 3GPP network and it acts a bridge connecting the MC clients (100) on the non 3GPP devices and the MC system or the wireless network (500). Hereafter, the term 'MC clients' when used in this document refers to the MC Clients residing on the non 3GPP devices. The MC system would be requiring the location information of the MC client (100) and the location information could be either requested by other MC clients or MC service servers. Location management procedures are described in 3GPP TS 23.380 and the location management server (300) can request the location information from the MC clients (100) by sending the location reporting configuration and location information request. Sometimes, the triggering criteria set in the Location reporting configuration and the requested location information could be related to the 3GPP access network. The MC clients (100) would not be able to handle the triggering criteria and the location information related to the 3GPP access network. The MC clients (100) are connected to the MC system through the MC gateway UE (200) and the MC gateway UE (200) is connected to the 3GPP access network. Since the MC clients (100) would be residing closer to the MC gateway UE (200) the location information of the MC clients (100) would be more or less same as the location information of the MC gateway UE (200). The MC clients (100) can fetch the location information related to the 3GPP access network (Cell ID, tracking area, serving Ecgi, Neighouring Ecgi, PLMN ID, MBMS service Area, MBMS FN Area etc.,) from the MC gateway UE (200) whenever required and use that information while sending the location report to the MC system. The Location management client depicted in this invention is part of the MC Client (100) residing in the non 3GPP devices.

Event Triggered Location Reporting Procedure: The MC clients (100) on receiving the location reporting configuration from the location management server (300) it checks for the below:
  1. Whether triggering criteria in the emergency and non-emergency cases contains any of the triggers related to the 3GPP access network information.
  2. Whether the requested location information for emergency and non-emergency cases contains the details related to the 3GPP access network.

If the triggering criteria contains triggers related to the 3GPP access network information, the MC client (100) constructs the MC GW location reporting configuration with the required details and sends it to the MC Gateway UE (200). The MC gateway UE (200), on receiving the MC GW location reporting configuration, starts monitoring for the triggers as specified in the MC GW location reporting configuration. If any of the trigger events occur, the MC gateway UE (200) sends the MC GW location report to the MC client (100) which contains the requested location information and the identity of the event that triggered the sending of the location report. The MC client (100), on receiving the MC GW location report from the MC Gateway UE (200), constructs the Location report accordingly and send it to the location management server (300).

FIGS. 1A and 1B illustrate a sequence diagram of a high level procedure of event triggered location reporting and the detailed steps are as below:

The difference between the procedures illustrated in FIGS. 1A and 1B is in Step 1 and Step 6. FIG. 1B elaborates the steps 1 and 6 and is explained in the steps as OR condition.

The following are the pre-conditions:
  1. The MC service user wishes to have access to MC services using a non-3GPP device.
  2. The MC client (100) successfully completed service authorization via MC Gateway UE (200)

Referring to the FIG. 1A, at step 1, the MC client (100) receives the location reporting configuration request from the LMS (300), which contains the triggering criteria of 3GPP access network related location information changes.

At step 2, the MC client (100) sends the MC GW Location reporting configuration to the MC Gateway UE (200) containing the 3GPP access network related location information triggers and the requested location information. The MC Gateway UE (200) stores the location reporting configuration and starts monitoring for the triggers as received in the MC GW location reporting configuration. The triggering criteria received from the multiple MC clients (100) may be same.

At step 3, the location reporting event occurs, triggering step 4. At step 4, the MC Gateway UE (200) sends the MC GW location information report containing the location information requested by the MC client (100).

At step 5, the MC client (100) updates the locally available location information with the location information received from the MC gateway UE (200). At step 6, a location management client (400a) (as shown in the FIG. 3) sends a location information report to the location management server (300), containing location information identified by the location management server (300) and available to the location management client (400a).

Referring to the FIG. 1B, at step 1a, the location management server (300) sends the location reporting configuration request targeted to the MC client (100) residing on the non 3GPP device. At step 1b, the MC Gateway UE (200) receives the location reporting configuration request targeted to the MC client (100) and forwards the same to the MC client (100).

At step 2, the MC client (100) sends the MC GW Location reporting configuration to the MC Gateway UE (200) containing the 3GPP access network related location information triggers and the requested location information. The MC Gateway UE (200) stores the location reporting configuration and starts monitoring for the triggers as received in the MC GW location reporting configuration. The triggering criteria received from the multiple MC clients (100) may be same At step 3, the Location reporting event occurs, triggering step 4. At step 4, the MC Gateway UE (200) sends the MC GW location information report containing the location information requested by the MC client (100).

At step 5, the MC client (100) updates the locally available location information with the location information received from the MC gateway.

At step 6a, the location management client (400a) sends a location information report to the MC Gateway UE (200), containing location information identified by the location management server (300) and available to the location management client (400a). At step 6b, the MC Gateway UE (200) forwards the location information report to the location management server (300).

At step 6a, the location management client (400a) sends the location information report addressed to the location management server (300) to the MC Gateway UE (200) and the MC Gateway UE (200) just forwards the location information report to the corresponding location management server (300).

Figure 2B:
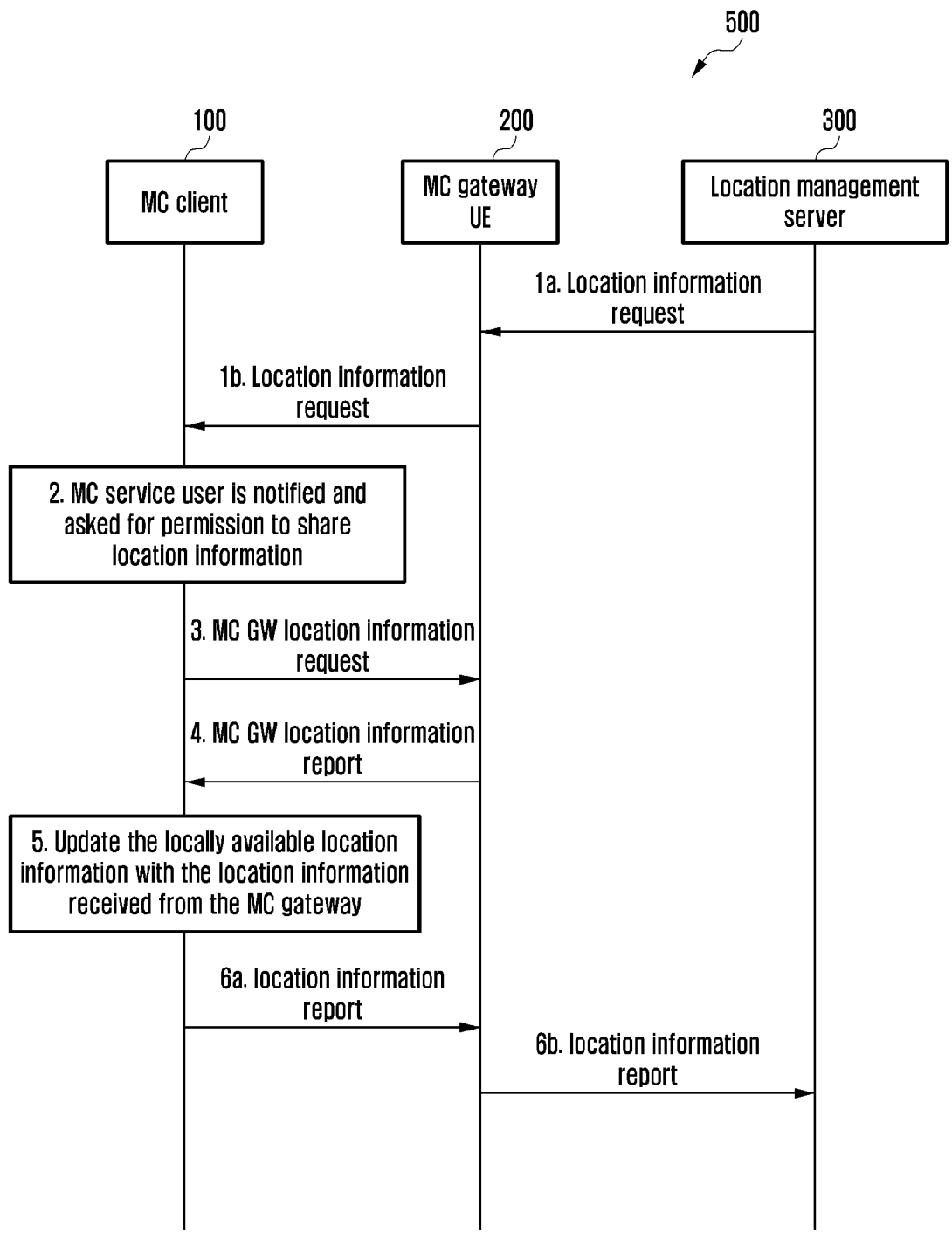

On-Demand Location reporting procedure: The MC Client (100) may need to fetch the location information related to the 3GPP access network from the MC gateway UE (200) immediately to handle the below cases or any other cases where MC client (100) has to send the location information to the Location management server (300) immediately:
1. Initial login,
2. Groupcall,
3. Private call,
4. Location configuration received, and
5. Location request received FIGS. 2A and 2B illustrate sequence diagrams of the on-demand location reporting procedure and the detailed steps are as below. The pre-conditions are as follows:
1. The MC service user wishes to have access to MC services using a non-3GPP device.
2. The MC client (100) successfully completed service authorization via the MC Gateway UE (200).

Referring to the FIG. 2a, at step 1, the MC client (100) receives the location information request from the LMS (300) to send the location information immediately or any other events where it has to send the location report to the location management server (300) immediately like initial login, group call etc. Requested location information includes the location information related to 3GPP access network.

At step 2, the MC service user is notified and asked for permission to share location information. MC service user can accept or deny the request. At step 3, the MC client (100) sends the MC GW Location information request to the MC Gateway UE (200) requesting for the location information related to the 3GPP access network of the MC Gateway UE (200).

At step 4, the MC Gateway UE (200) sends the MC GW Location information report containing the location information requested by the MC client (100). At step 5, the MC client (100) updates the locally available location information with the location information received from the MC gateway UE (200).

At step 6, the MC client (100) sends a location information report to the location management server (300), containing location information identified by the location management server (300) and available to the MC client (100).

Referring to the FIG. 2b, at step 1a, the location management server (300) sends the Location information request targeted to the MC client (100) residing on the non 3GPP device requesting it to send the location information immediately and the requested location information includes the location information related to 3GPP access network. At step 1b, the MC Gateway UE (200) receives the location information request and forwards to the targeted MC client (100).

At step 2, the MC service user is notified and asked for permission to share location information. MC service user can accept or deny the request. At step 3, the MC client (100) sends the MC GW Location information request to the MC Gateway UE (200) requesting for the location information related to the 3GPP access network of the MC Gateway UE (200).

At step 4, the MC Gateway UE (200) sends the MC GW Location information report containing the location information requested by the MC client (100). At step 5, the MC client (100) updates the locally available location information with the location information received from the MC gateway UE (200).

At step 6a, the MC client (100) sends a location information report to the MC Gateway UE (200), containing location information identified by the location management server (300) and available to the MC client (100). At step 6b, the MC Gateway UE (200) forwards the location information report to the location management server (300).

In step 6a, the MC client (100) sends the location information report addressed to the location management server (300) to the MC Gateway UE (200) and MC Gateway UE (200) just forwards the location information report to the corresponding location management server (300).

Information flow for the MC GW Location reporting configuration: Table 1 below describes the information flow from MC client (100) to the MC gateway UE (200) for the MC GW Location reporting configuration.

TABLE 1

| Information element | Status | Description |
| --- | --- | --- |
| GW MC service ID | M | The GW MC service ID of the requesting MC service user. |
| Requested location information | O (see Note 1) | Identifies what location information is requested |
| Triggering criteria | O (see Note 1) | Identifies when the MC gateway UE will send the location report to the MC service client |
| Minimum time between consecutive reports | O(see Note 1) | Defaults to 0 if absent |

Note 1:
If none of the information elements are present, this represents a cancellation for location reporting, if configured.

Information flow for the MC GW Location information report: Table 2 describes the information flow from MC Gateway UE (200) to the MC service Client (residing on non 3GPP devices) for the location information reporting.

TABLE 2

| Information element | Status | Description |
| --- | --- | --- |
| GW MC service ID | M | The GW MC service ID of the MC service user |
| Triggering event | O | Identity of the event that triggered the sending of the report |
| Location Information (see NOTE 1) | M | Location information of the MC gateway UE requested by the MC service client |

NOTE 1:
The following location information elements which are related to 3GPP access network shall be present (configurable): Serving and neighbouring ECGI, MBMS SAIs, MBMSfnArea, PLMN ID Information flow for the MC GW Location information request: Table 3 describes the information flow from the MC service Client (residing on non 3GPP devices) to MC Gateway UE (200) for requesting an immediate location information report.

TABLE 3

| Information element | Status | Description |
| --- | --- | --- |
| GW MC service ID | M | The GW MC service ID of the requesting MC service user. |

Dedicated Channel for Messages to be Handled by MC Gateway UE

The MC gateway UE (200) acts as an MC application connection node which enables and handles user signalling traffic and media plane traffic individually, i.e., on a per MC service user basis, between the MC client (100) and the corresponding MC server.

The CSC-GW reference point, which exists between the MC Application client and the MC gateway UE client, is used for connection authorization of non-3GPP devices with an MC gateway UE (200).

Embodiments herein propose either to reuse the CSW-GW reference point that is proposed in 3GPP TR 23.700-79 for sending the location information related requests and responses between MC clients (100) and MC gateway UE (200) or introduce a new reference point over which the location information related request and response can be sent. This way it will help the MC gateway UE (200) to differentiate the messages that it needs to process or it needs to forward to the MC system.

Location Management Server Getting the Location Information from MC Gateway UE

The location management server (300) should know the list of MC service clients accessing the MC system via the MC Gateway UE (200) from the non 3GPP devices. It should maintain the information containing MC Gateway UEs (200) and the list of MC Service clients accessing the MC system through a particular MC gateway UE (200). The location management server (300) can update this information whenever connection authorization of MC client (100) is made with the location management server (300) via the MC gateway UE (200).

When the location management server (300) is sending the Location reporting configuration request to the MC service client, it checks whether this particular MC service client is residing on the non 3GPP device and is accessing the MC system via MC Gateway UE (200) and if the requested location information and the triggering criteria are related to the 3GPP access information. If so, then the location management server (300) sends the location reporting configuration request to the MC Gateway UE (200) containing only the triggering criteria and requested location information related to the 3GPP access network. Whenever the Location management server (300) receives the location information from MC service client and if there is a need to include the location information related to the 3GPP access information, it updates the location information from the MC service client with the location information received from the MC gateway UE (200) before sending it to the requested entity.

The location management server (300) should also maintain the location triggers and the list of MC service clients associated with the triggers, so that whenever it receives location information report from the MC gateway UE (200) and based on the triggering event it can determine which MC client location information to be updated. Location management server (300) shall be able to maintain the latest location information before sending the location information of the MC client (100) to the requested entities. Whenever Location management server (300) receives the location information report from the MC gateway UE (200), it fetches the latest location information (not related to 3GPP access network) from the MC client (100) and vice versa. The location management server (300) merges the location information related to the 3GPP access network received from MC gateway UE (200) and the location information report received from the MC client (100) and send it to the requested entity as a single location information report as received from the MC client (100).

On-Demand Location Reporting Procedure

Figure 3:
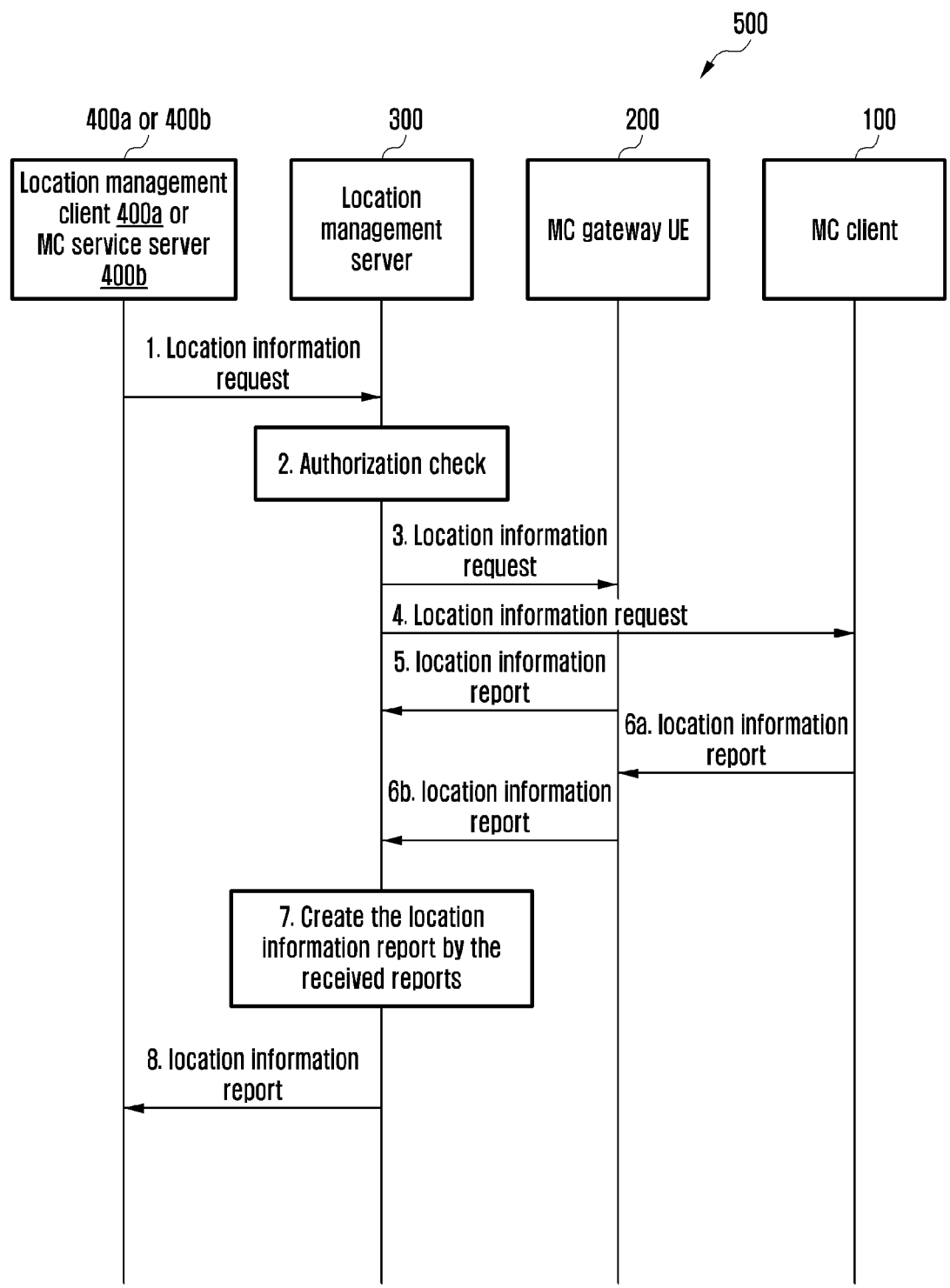
FIG. 3 depicts a sequence diagram in which a LMS handles the on-demand location reporting procedure, according to embodiments as disclosed herein.

FIG. 3 illustrates the on-demand location reporting procedure and the detailed steps are as below. The pre-conditions are as follows:

1. The MC service user wishes to have access to MC services using a non-3GPP device.
2. The MC client (100) successfully completed service authorization via MC Gateway UE (200).
3. Location management server (300) has already sent the location reporting configuration to the MC gateway UE (200) and the MC client (100) containing the initial configuration (or a subsequent update) for reporting the location of the MC client UE.

At step 1, the MC service server (400*b*) or the location management client (400*a*) sends the location information request to the location management server (300). At step 2, the location management server (300) checks if the MC service server or location management client (400*a*) is authorized to request the location information.

At step 3, the location management server (300) sends the location information request to the MC gateway UE (200). At step 4, the location management server (300) sends the location information request to the MC client (100) residing on the non 3GPP device.

At step 5, the location management client (400*a*) residing on the MC gateway UE (200) immediately responds to the location management server (300) with a report containing location information identified by the location management server (300) and available to the location management client (400*a*). This location information report contains the location information mainly related to the 3GPP access network.

At step 6*a*, the location management client (400*a*) sends a location information report to the MC Gateway UE (200), containing location information identified by the location management server (300) and available to the location management client (400*a*). The location management client (400*a*) sends the location information report addressed to the location management server (300) to the MC Gateway UE (200) and the MC Gateway UE (200) just forwards the location information report to the corresponding location management server (300).

At step 6*b*, the MC Gateway UE (200) forwards the location information report to the location management server (300).

At step 7, upon receiving the report, the location management server (300) updates the location of the reporting location management client (400*a*). If the location management server (300) does not have location information of the reporting location management client (400*a*), the location management server (300) just stores the reporting location information for that location management client (400*a*). Final stored location report will be the consolidated report received from the MC gateway UE (200) and the MC client (100).

At step 8, then, location management server (300) immediately sends the location information report including the latest location information acquired of one or more MC service users.

Event Triggered Location Reporting Procedure

Figure 4:
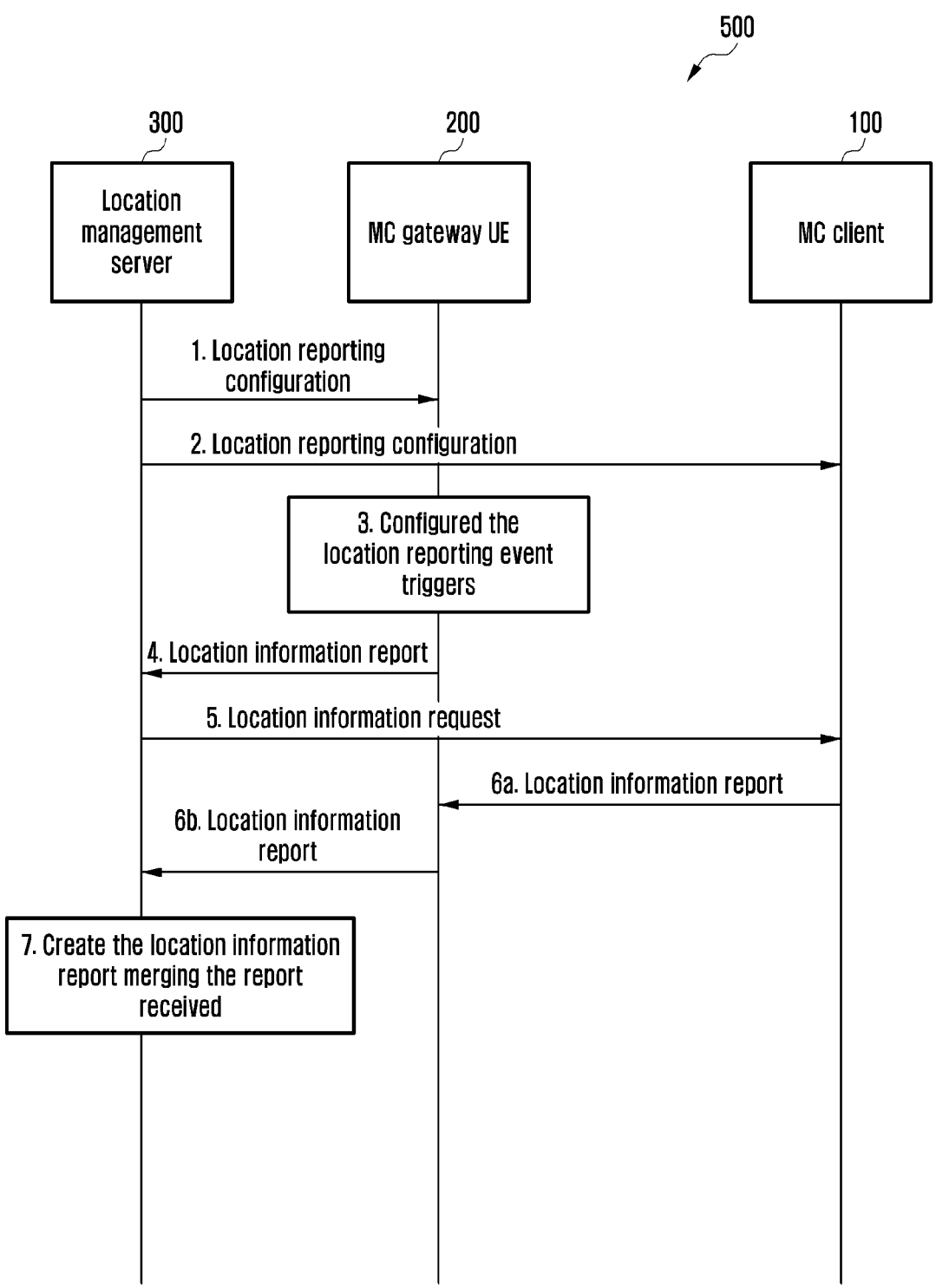
FIG. 4 depicts a sequence diagram in which the LMS handles an event-triggered location reporting procedure, according to embodiments as disclosed herein.

FIG. 4 illustrates sequence diagram of the on-demand location reporting procedure and the detailed steps are as below. The pre-conditions are as follows:

1. The MC service user wishes to have access to MC services using a non-3GPP device.

2. The MC client (100) successfully completed service authorization via MC Gateway UE (200).

At step 1, the Location management server (300) sends the location reporting configuration to the MC gateway UE (200). This configuration mainly contains the triggers related to the 3GPP access network related location information. At step 2, the location management server (300) sends the location reporting configuration to the MC client (100) and this configuration shall not contain the triggers or the requested location information related to the 3GPP access network.

At step 3, the location reporting event occurs triggering the step 4. At step 4, the MC gateway UE (200) sends a location information report to the location management server (300), containing location information identified by the location management server (300) and available to the MC gateway UE (200).

At step 5, if there is no recent location information report received from the MC client (100), the location management server (300) sends the location information request to the MC client (100) to fetch the latest location information.

At step 6a, the location management client (400a) sends a location information report to the MC Gateway UE (200), containing location information identified by the location management server (300) and available to the location management client (400a). The location management client (400a) sends the location information report addressed to the location management server (300) to the MC Gateway UE (200) and MC Gateway UE (200) just forwards the location information report to the corresponding location management server (300).

At step 6b, the MC Gateway UE (200) forwards the location information report to the location management server (300).

At step 7. Upon receiving the report, the location management server (300) updates the location of the reporting location management client (400a). If the location management server (300) does not have location information of the reporting location management client (400a), the location management server (300) just stores the reporting location information for that location management client (400a). Final stored location report will be the consolidated report received from the MC gateway UE (200) and the MC client (100).

Figure 5:
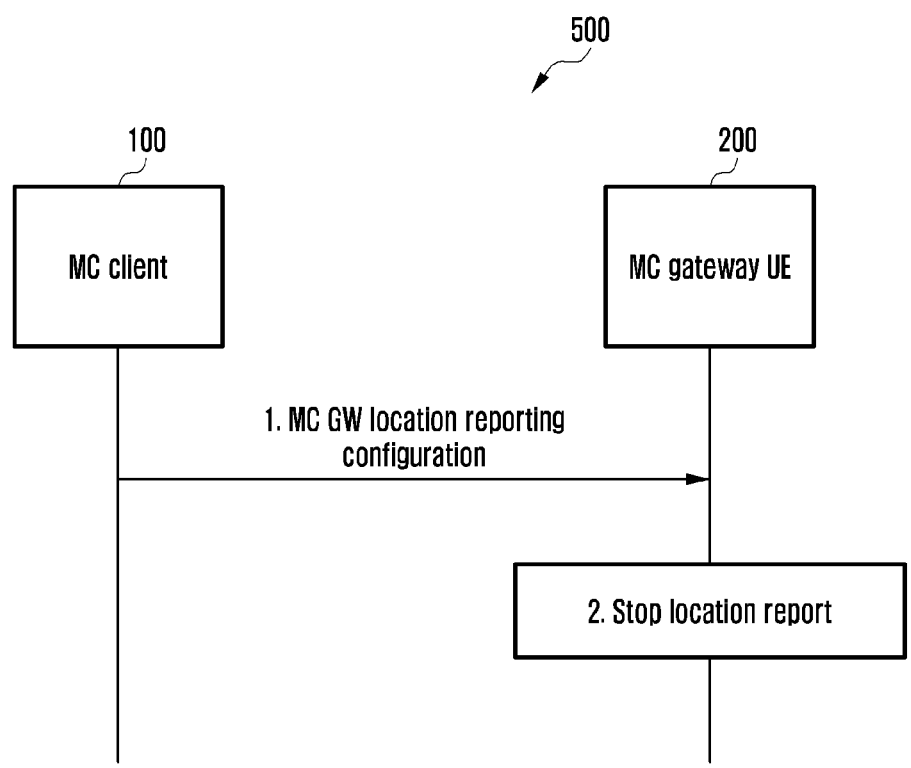
FIG. 5 depicts a sequence diagram of cancel location reporting procedure, according to embodiments as disclosed herein.

Location Reporting Cancel Procedure:

FIG. 5 illustrates the procedure of how the MC client (100) cancels the location reporting from the MC Gateway UE (200). The location reporting cancel procedure reuses the information flow of location reporting configuration.

The pre-conditions are as follows:
1. The MC service user wishes to have access to MC services using a non-3GPP device.
2. The MC client (100) successfully completed service authorization via the MC Gateway UE (200).
3. The location management client (400a) no longer needs the location information report from MC Gateway UE (200).

At step 1, the MC client (100) sends MC GW location reporting configuration without any information element to the MC Gateway UE (200) to stop location reporting from the MC Gateway UE (200). At step 2, the MC gateway UE (200) stops sending location information reports to the MC client (100).

Figure 6:
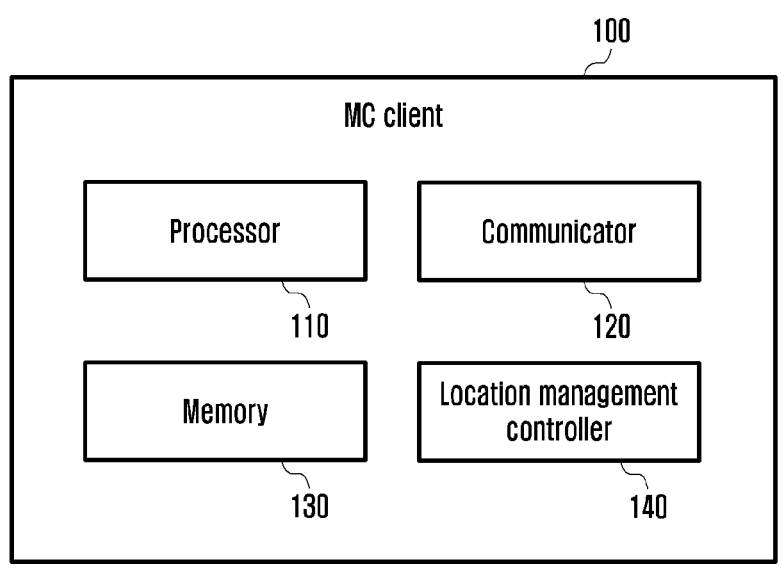
FIG. 6 shows various hardware components of a MC client, according to embodiments as disclosed herein.

FIG. 6 shows various hardware components of the MC client (100), according to embodiments as disclosed herein. In an embodiment, the MC client (100) includes a processor (110), a communicator (120), a memory (130), and a location management controller (140). The processor (110) is coupled with the communicator (120), the memory (130), and the location management controller (140).

The location management controller (140) is configured to receive the location reporting configuration request and the location information request from the location management server (300). In an embodiment, the location reporting configuration request includes the triggering criteria corresponding to the 3GPP access network related location information change. In another embodiment, the location information request includes the location information related to the 3GPP access network related location information. In an embodiment, the MC GW location reporting configuration request includes the GW MC service ID, requested location information, triggering criteria, and minimum time between location information reports.

Further, the location management controller (140) is configured to send the MC GW location reporting configuration request to the MC gateway UE (200) based on the location reporting configuration request for the event triggered location reporting and the MC gateway location information request for the on-demand location to request the 3GPP access network related location information based on the location information request. In an embodiment, the MC gateway location information request for the on-demand location to request the 3GPP access network related location information is sent by notifying a MC service user to obtain a permission to share location information. The location management controller (140) is configured to receive the MC GW location information report comprising location information requested by the MC client (100). The MC GW location information report includes the GW MC service ID, the triggering event, and the location information.

The location management controller (140) configures the location information report comprising locally available location information and the location information received from the MC gateway UE (200). The location management controller (140) is configured to send the location information report to the location management server (300) through the MC gateway UE (200).

The location management controller (140) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The location management controller (140) be included in the processor (110). If the location management controller (140) is included in the processor (110), the operation of the location management controller (140) described above may be performed by the processor (140).

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the pluralities of modules/controller may be implemented through the AI model using the data driven controller. The data driven controller can be a ML model-based controller and AI model based controller. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 6 shows various hardware components of the MC client (100) but it is to be understood that other embodiments are not limited thereon. In other embodiments, the MC client (100) may include less or more number of components. Further, the labels or names of the components are used only for illustrative purpose and does not limit the scope of the invention. One or more components can be combined together to perform same or substantially similar function in the MC client (100).

Figure 7:
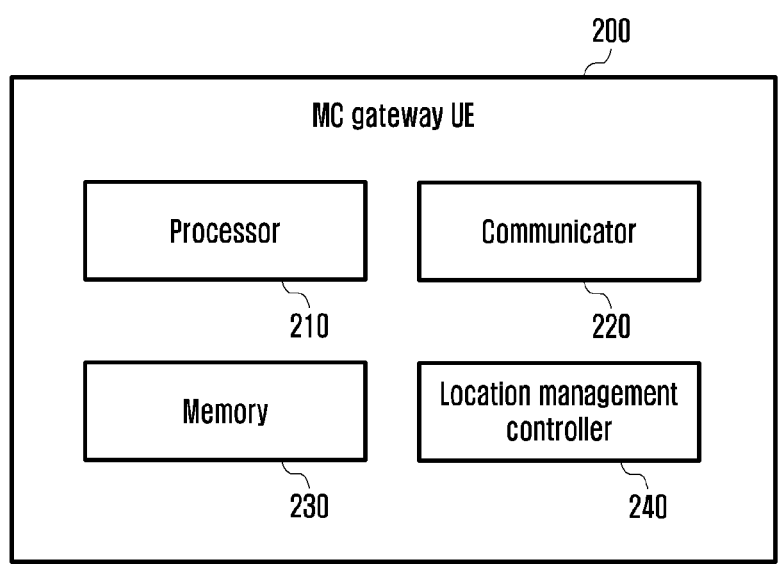
FIG. 7 shows various hardware components of a MC gateway UE, according to embodiments as disclosed herein.

FIG. 7 shows various hardware components of the MC gateway UE (200), according to embodiments as disclosed herein. In an embodiment, the MC gateway UE (200) includes a processor (210), a communicator (220), a memory (230), and a location management controller (240). The processor (210) is coupled with the communicator (220), the memory (230), and the location management controller (240).

The location management controller (240) is configured to receive the MC GW location reporting configuration request and MC GW location information request from the MC client (100). The location reporting configuration request includes the location trigger events related to the 3GPP access network related location information. The MC client (100) receives the location information request containing the 3GPP access network related information from the location management server (300). Further, the location management controller (240) is configured to send the MC GW location information report comprising location information requested by the MC client (100).

The location management controller (240) is configured to send the MC GW location information report comprising the location information requested by the MC client (100) when the configured location reporting event triggers or when the MC client requests immediate location report. Also, the location management controller (240) is configured to store the 3GPP access network related location information trigger and start monitoring for the trigger, and wherein the MC client (100) resides on the non-3GPP device.

In another embodiment, the location management controller (240) is configured to receive the MC GW location reporting configuration request from the MC client (100). The MC GW location reporting configuration request notifies to stop the MC GW location information report from the MC Gateway UE (200). Based on the MC GW location reporting configuration request, the location management controller (240) is configured to stop to prepare the MC GW location information report.

The location management controller (240) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The location management controller (240) be included in the processor (210). If the location management controller (240) is included in the processor (210), the operation of the location management controller (240) described above may be performed by the processor (240).

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the pluralities of modules/controller may be implemented through the AI model using the data driven controller. The data driven controller can be a ML model based controller and AI model based controller. A function associated with the AI model may be performed through the non-volatile memory, the volatile memory, and the processor (210). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 7 shows various hardware components of the MC gateway UE (200) but it is to be understood that other embodiments are not limited thereon. In other embodiments, the M MC gateway UE (200) may include less or more number of components. Further, the labels or names of the components are used only for illustrative purpose and does not limit the scope of the invention. One or more components can be combined together to perform same or substantially similar function in the MC gateway UE (200).

Figure 8:
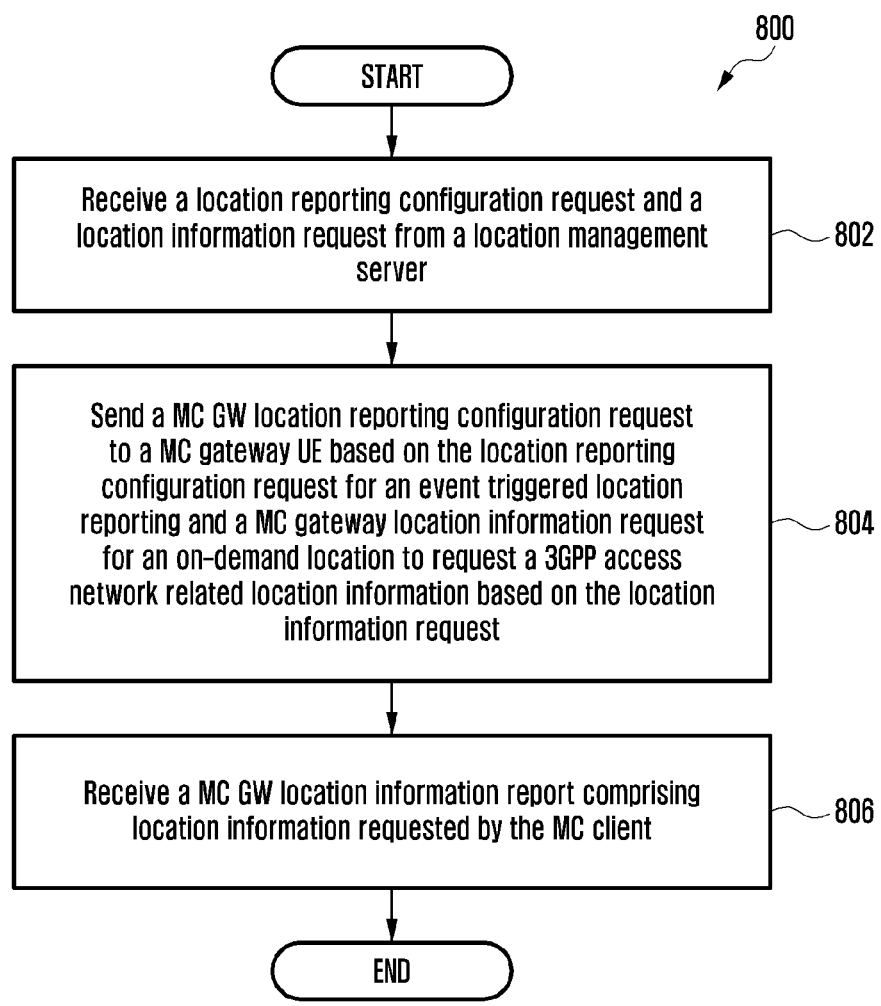
FIG. 8 is a flow chart illustrating a method, implemented by the MC client, for location management in a wireless network, according to embodiments as disclosed herein.

FIG. 8 is a flow chart (800) illustrating a method, implemented by the MC client (100), for location management in the wireless network (500) (e.g., fifth generation network, Open Radio Access Network (O-RAN) or the like), according to embodiments as disclosed herein.

Referring to the FIG. 8, the operations (802-806) are handled by the location management controller (140). At 802, the method includes receiving the location reporting configuration request and the location information request from the location management server (300). At 804, the method includes sending the MC GW location reporting configuration request to the MC gateway UE (200) based on the location reporting configuration request for the event triggered location reporting and the MC gateway location information request for the on-demand location to request the 3GPP access network related location information based on the location information request. At 806, the method includes receiving the MC GW location information report comprising location information requested by the MC client (100).

Figure 9:
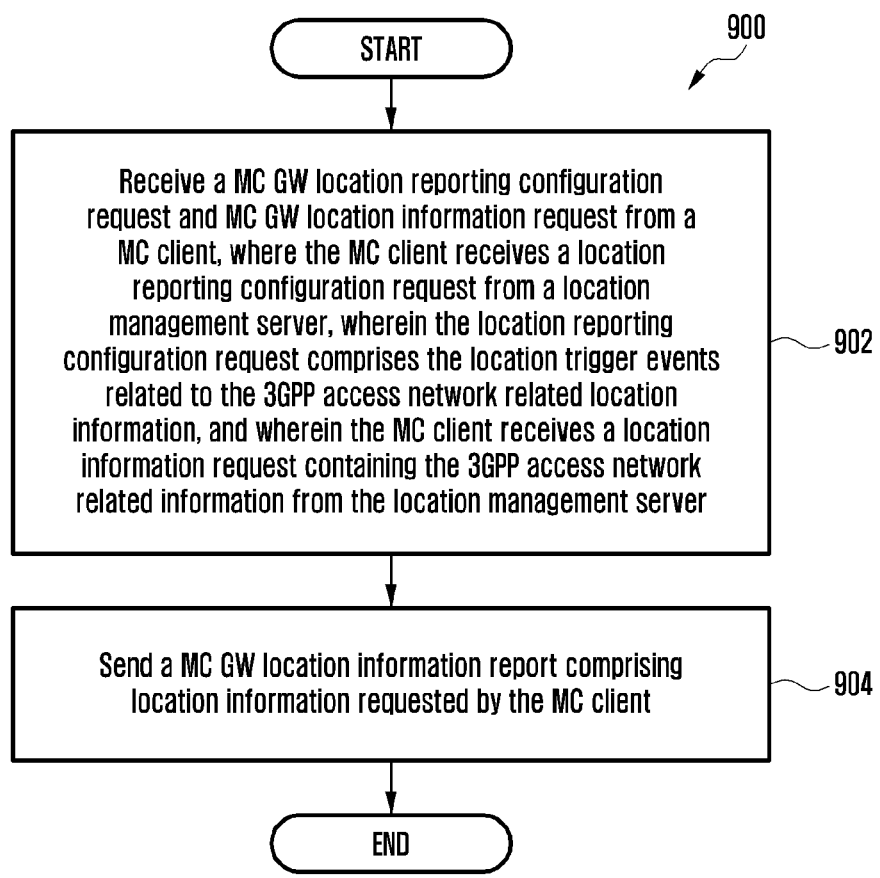
FIG. 9 and FIG. 10 are flow charts illustrating a method, implemented by the MC gateway UE, for location management in the wireless network, according to embodiments as disclosed herein.
Figure 10:
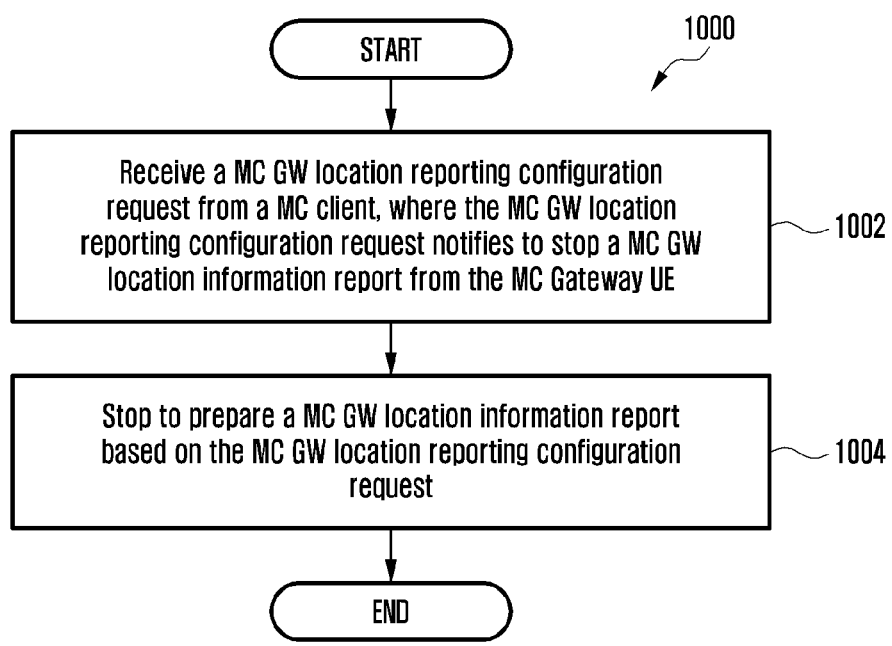

FIG. 9 and FIG. 10 are flow charts (900 and 1000) illustrating a method, implemented by the MC gateway UE (200), for location management in the wireless network (500), according to embodiments as disclosed herein.

Referring to the FIG. 9, the operations (902 and 904) are handled by the location management controller (240). At 902, the method includes receiving the MC GW location reporting configuration request and MC GW location information request from the MC client (100). The MC client (100) receives a location reporting configuration request from the location management server (300). The location reporting configuration request includes the location trigger events related to the 3GPP access network related location information. The MC client (100) receives the location information request containing the 3GPP access network related information from the location management server (300). At 904, the method includes sending the MC GW location information report comprising the location information requested by the MC client (100).

Referring to the FIG. 10, the operations (1002 and 1004) are handled by the location management controller (240). At 1002, the method includes receiving the MC GW location reporting configuration request from the MC client (100). The MC GW location reporting configuration request notifies to stop the MC GW location information report from the MC Gateway UE (200). At 1004, the method includes stopping to prepare the MC GW location information report based on the MC GW location reporting configuration request.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

The present disclosure can be used when a location report of MC clients residing on a non 3GPP device is required in a wireless communication system.

The invention claimed is:

1. A method for managing a location of a mission critical (MC) client in a wireless network, comprising:
   receiving, from a location management server (LMS), a location reporting configuration request containing a triggering criteria associated with change of 3rd generation partnership project (3GPP) access network related location information;
   sending, to a MC gateway UE, a MC gateway (GW) location reporting configuration request containing the triggering criteria;
   receiving, from the MC gateway UE, a MC GW location information report containing location information requested by the MC client;

updating locally available location information with the location information received from the MC gateway UE; and sending, to the LMS, a location information report including the updated locally available location information, wherein the MC client residing on a non-3GPP device.

2. The method of claim 1, wherein the MC GW location reporting configuration request includes at least one of a GW MC service identifier (ID), requested location information, triggering criteria, and minimum time between location information reports.

3. The method of claim 1, wherein the MC GW location information report includes at least one of a GW MC service ID, a triggering event, and location information.

4. The method of claim 1, further comprising:

sending, to the MC gateway UE, the MC GW location reporting configuration without any information element, in case that the location information report is no longer required.

5. A mission critical (MC) client in a wireless network (500), the MC client comprising:

a memory;

a communicator configured to communicate with a MC gateway UE in a non-3rd generation partnership project (3GPP) access scheme; and at least one processor, coupled to the memory and the communicator, configured to:

receive, from a location management server (LMS), a location reporting configuration request containing a triggering criteria associated with change of 3rd generation partnership project (3GPP) access network related location information;

send, to a MC gateway UE, a MC gateway (GW) location reporting configuration request containing the triggering criteria;

receive, from the MC gateway UE, a MC GW location information report containing location information requested by the MC client;

update locally available location information with the location information received from the MC gateway UE; and send, to the LMS, a location information report including the updated locally available location information.

6. The MC client of claim 5, wherein the MC GW location reporting configuration request includes at least one of a GW MC service identifier (ID), requested location information, triggering criteria, and minimum time between location information reports.

7. The MC client of claim 5, wherein the MC GW location information report includes at least one of a GW MC service ID, a triggering event, and location information.

8. The MC client of claim 5, wherein the at least one processor further configured to send, to the MC gateway UE, the MC GW location reporting configuration without any information element, in case that the location information report is no longer required.

* * * * *